(12) United States Patent
Scerbak et al.

(10) Patent No.: US 12,181,738 B2
(45) Date of Patent: Dec. 31, 2024

(54) SINGLE AND MULTI-STAGE HIGH POWER OPTICAL ISOLATORS USING A SINGLE POLARIZING ELEMENT

(71) Applicant: Electro-Optics Technology, Incorporated, Traverse City, MI (US)

(72) Inventors: David G. Scerbak, Traverse City, MI (US); Evan Rogers, Traverse City, MI (US); Amir Jalali Roudsar, Traverse City, MI (US); Joseph R. Mambourg, Spring Lake, MI (US)

(73) Assignee: Electro-Optics Technology, Incorporated, Traverse City, MI (US)

( * ) Notice: Subject to any disclaimer, the term of this patent is extended or adjusted under 35 U.S.C. 154(b) by 0 days.

(21) Appl. No.: 18/321,513

(22) Filed: May 22, 2023

(65) Prior Publication Data

US 2023/0296930 A1 Sep. 21, 2023

Related U.S. Application Data

(60) Division of application No. 16/521,731, filed on Jul. 25, 2019, now Pat. No. 11,693,267, which is a
(Continued)

(51) Int. Cl.
*G02F 1/09* (2006.01)
*G02F 1/00* (2006.01)

(52) U.S. Cl.
CPC .................. *G02F 1/093* (2013.01)

(58) Field of Classification Search
CPC ........................................ G02F 1/093
(Continued)

(56) References Cited

U.S. PATENT DOCUMENTS 4,178,073 A * 12/1979 Uchida ............... G02F 1/093
359/484.04
4,588,296 A * 5/1986 Cahill ................. G01C 19/726
359/287
(Continued)

FOREIGN PATENT DOCUMENTS

CA 2225766 A1 * 6/1988
WO WO-2011031310 A1 * 3/2011 ........... G02B 27/283

OTHER PUBLICATIONS

Advisory Action received for U.S. Appl. No. 15/381,502 mailed on Apr. 18, 2019, 3 pages.
(Continued)

*Primary Examiner* — Kaveh C Kianni
(74) *Attorney, Agent, or Firm* — Morrison & Foerster LLP

(57) ABSTRACT

An optical isolator for generally collimated laser radiation includes a single polarizing element, at least one Faraday optical element, at least one reciprocal polarization altering optical element disposed at the single polarizing element, at least one reflective optical element for reflecting radiation to provide an even number of passes through the at least one Faraday optical element, and a magnetic structure. The magnetic structure is capable of generating a magnetic field within the at least one Faraday optical element that is generally aligned with the even number of passes along a beam propagation axis. The optical isolator is configured to receive generally collimated laser radiation, which passes through the single polarizing element and the at least one reciprocal polarization altering optical element and which makes at least two passes through the at least one Faraday optical element, whereby generally collimated laser radiation is output from the optical isolator.

17 Claims, 9 Drawing Sheets

Related U.S. Application Data continuation of application No. 15/381,502, filed on Dec. 16, 2016, now abandoned.

(60) Provisional application No. 62/269,349, filed on Dec. 18, 2015.

(58) Field of Classification Search
USPC .......................................................... 359/480
See application file for complete search history.

(56) References Cited

U.S. PATENT DOCUMENTS

| | | | | |
|---|---|---|---|---|
| 4,909,612 A * | 3/1990 | Scerbak | .................. | G02F 1/093 359/489.02 |
| 4,969,720 A * | 11/1990 | Lins | .................... | G02B 6/2746 359/302 |
| 5,237,445 A * | 8/1993 | Kuzuta | .................. | G02F 1/093 359/281 |
| 5,355,249 A * | 10/1994 | Souda | .................. | G02B 6/4208 359/341.1 |
| 5,499,132 A * | 3/1996 | Tojo | ........................ | G02B 6/272 385/11 |
| 5,715,080 A * | 2/1998 | Scerbak | .................. | G02F 1/093 359/484.04 |
| 5,892,749 A * | 4/1999 | Yamanaka | ........... | G11B 7/1395 369/44.37 |
| 6,048,103 A * | 4/2000 | Furukata | .............. | G02B 6/3825 385/73 |
| 6,175,667 B1 | 1/2001 | Wang et al. | | |
| 6,480,331 B1 * | 11/2002 | Cao | .......................... | G02F 1/093 359/489.05 |
| 6,498,680 B1 * | 12/2002 | Zhou | .................. | G02B 6/29302 359/489.08 |
| 7,057,791 B2 * | 6/2006 | Azimi | ..................... | G02F 1/093 359/280 |
| 7,306,376 B2 | 12/2007 | Scerbak et al. | | |
| 7,426,325 B2 | 9/2008 | Scerbak et al. | | |
| 8,547,636 B1 | 10/2013 | Niessink | | |
| 9,268,159 B2 | 2/2016 | Rogers et al. | | |
| 11,693,267 B2 | 7/2023 | Scerbak et al. | | |
| 2002/0122614 A1 * | 9/2002 | Zhou | ................... | H04J 14/0208 385/24 |
| 2003/0053209 A1 * | 3/2003 | Chang | ..................... | G02F 1/093 359/489.05 |
| 2003/0206345 A1 * | 11/2003 | Sabia | ...................... | C03C 27/06 156/99 |
| 2004/0091196 A1 * | 5/2004 | Li | ......................... | G02B 6/2746 385/11 |
| 2004/0120683 A1 * | 6/2004 | Cohen | .................. | G02F 1/1326 385/140 |
| 2005/0146769 A1 * | 7/2005 | Iwatsuka | ................. | G02F 1/092 359/280 |
| 2006/0268405 A1 | 11/2006 | Takeuchi et al. | | |
| 2007/0177264 A1 * | 8/2007 | Konno | ................. | G02B 6/2746 359/489.08 |
| 2008/0317201 A1 * | 12/2008 | Hogan | ................. | A61B 5/0002 378/19 |
| 2011/0063728 A1 * | 3/2011 | Cai | ...................... | G02B 27/283 359/484.09 |
| 2014/0139911 A1 | 5/2014 | Jalali | | |
| 2014/0218795 A1 * | 8/2014 | Scerbak | .................. | G02F 1/093 359/484.04 |
| 2015/0124318 A1 * | 5/2015 | Scerbak | .................. | G02F 1/093 359/484.04 |
| 2016/0109735 A1 * | 4/2016 | Nakamura | ........... | G02B 27/286 359/484.03 |
| 2017/0176781 A1 | 6/2017 | Scerbak et al. | | |

OTHER PUBLICATIONS

Final Office Action received for U.S. Appl. No. 15/381,502 mailed on Jan. 28, 2019, 10 pages.

Office Action received for U.S. Appl. No. 15/381,502 mailed on Aug. 30, 2018, 11 pages.

Notice of Allowance received for U.S. Appl. No. 16/521,731 mailed on Feb. 23, 2023, 8 pages.

Office Action received for U.S. Appl. No. 16/521,731 mailed on Aug. 18, 2022, 9 pages.

Restriction Requirement received for U.S. Appl. No. 16/521,731 mailed on May 31, 2022, 6 pages.

* cited by examiner

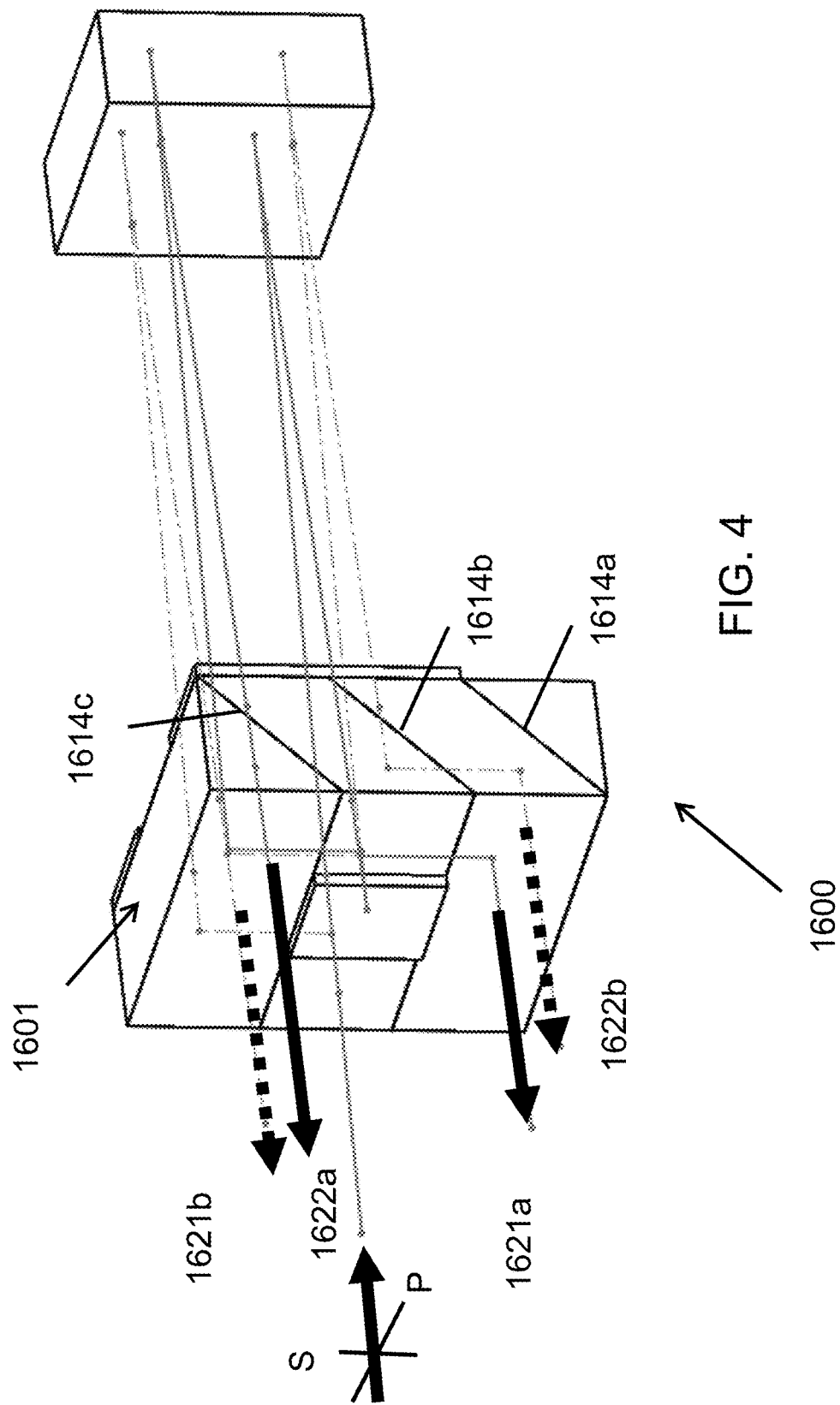

SINGLE AND MULTI-STAGE HIGH POWER OPTICAL ISOLATORS USING A SINGLE POLARIZING ELEMENT

CROSS REFERENCE TO RELATED APPLICATIONS

This application is a divisional of U.S. application Ser. No. 16/521,731, filed Jul. 25, 2019, which is a continuation of U.S. application Ser. No. 15/381,502, filed Dec. 16, 2016, which claims the benefit of U.S. Provisional Application No. 62/269,349, filed Dec. 18, 2015, the entire contents of each of which are incorporated herein by reference.

FIELD OF THE INVENTION

The present invention relates to high power optical isolators and more particularly to high power single and multi-stage polarization maintaining ["PM"] and polarization insensitive ["PI"] optical isolators.

BACKGROUND OF THE INVENTION

Optical isolators are routinely used to decouple a laser oscillator from downstream laser amplifier noise radiation and/or target reflections. Optical isolators are typically comprised of a Faraday rotator surrounded by polarizers that are aligned with the input and output linear polarization states. A Faraday rotator is typically comprised of a non-reciprocal, optical element in a strong magnetic field that is co-axially aligned with the laser radiation so that the plane of polarization is rotated by 45 degrees. In an optical isolator, the non-reciprocal nature of the Faraday effect causes the plane of linear polarization in the backward propagating direction to be rotated an additional 45 degrees resulting in a polarization state which is 90 degrees to the transmission axis of the input polarizer. This results in reverse propagating radiation to experience high transmission losses while allowing forward propagating radiation to experience low transmission losses. Optical isolators suitable for randomly polarized light are also common and are termed polarization insensitive ["PI"] isolators such as disclosed in U.S. Pat. No. 4,178,073.

The sensitivity of distributed feedback diode lasers and other components in telecom systems to feedback from backward propagating radiation has prompted the development of multi-stage PI isolators to increase isolation to ≥60 dB. An example of such a multi-stage isolator is a two stage device disclosed in U.S. Pat. No. 5,237,445. To address the bulk and expense of high power Faraday rotators in the near infrared, the amount of Faraday rotation as given by the following equation has been examined:

$$\theta(\lambda,T) = V(\lambda,T) \times H(r,T) \times L_F \quad (1)$$

where:
- $\theta(\lambda,T)$: The Faraday rotation angle (a function of wavelength, $\lambda$, and temperature, T);
- $V(\lambda,T)$: A proportionality constant, termed the Verdet constant, of the Faraday element (a function of wavelength, $\lambda$, and temperature, T);
- $H(r,T)$: The strength of the magnetic field in the direction of light through the Faraday element (a function of radial position r across the beam and temperature, T); and
- $L_F$: The optical path length within the Faraday element.

Equation 1 states that the Faraday rotation angle can be increased by either an increase in the Verdet constant V ($\lambda$,T), the magnetic field strength H(T), or the Faraday element length $L_F$. In order to make an optical isolator as small and inexpensive as possible, multi-pass Faraday rotators have been disclosed, such as in U.S. Pat. Nos. 4,909,612; 5,715,080 and 7,057,791, which are hereby incorporated by reference in their entireties. The reduced gap between the magnets significantly improves the magnetic efficiency and uniformity of the magnetic assembly. As disclosed in U.S. Publication No. 2015/0124318 (which is hereby incorporated herein by reference in its entirety), these improvements increase the effective magnetic field H(r,T) and allow for reductions in the optical path length $L_F$, magnetic material volume, and Faraday optic volume. The reduction of the optical path length $L_F$, is additionally advantageous in high power applications for reductions in beam degradation due to absorption.

A fiber to fiber optical isolator for low power laser radiation is disclosed in U.S. Pat. No. 5,499,132. This optical isolator is applicable to only fiber to fiber devices and requires an internal focusing lens for proper operation. In addition, optical damage due to high fluence levels of the small beam diameters at the fibers as well as in the birefringent crystal plate prevents scaling of this device to powers above 10 W.

SUMMARY OF THE INVENTION

The present invention provides PM and PI multi-pass isolator forms that are simple to align, have few optical parts to assemble and work well with scalable beam diameters large enough to prevent optical damage in the optical elements of the isolator when used with high peak and average power laser sources. The present invention relates to high peak and average power optical isolators and more particularly to high power single and multi-stage polarization maintaining ["PM"] and polarization insensitive ["PI"] optical isolators with improved size, improved alignment simplicity, reduced parts count, and reduced cost.

According to an aspect of the present invention, an optical isolator for generally collimated laser radiation is provisioned with one or more isolation stages using a single polarizing element, a multi-pass Faraday rotator through which light passes an even number of times and one 45 degree reciprocal polarization rotation element per isolation stage. The single polarizing element enables simple alignment and reduced parts count in an optical isolator that is scalable in beam diameter for high power operation.

In a preferred embodiment, the multi-pass Faraday rotator comprises a Faraday optic with a highly reflective coating on one optical face and an anti-reflective coating on the opposite optical face nearest to the single polarizing element. A magnetic field generally aligned to the beam path in the multi-pass Faraday rotator causes 45 degree non-reciprocal polarization rotation in the Faraday optic for each isolation stage.

The 45 degree reciprocal polarization rotation element may comprise a quartz wave plate and may be bonded, such as by adhesive free optical contact for high power applications, to the surface of the single polarizing element at only a portion of the single polarizing element such that the wave plate is located in only one pass of the beam path and is aligned for the opposite sense rotation that is opposite to the Faraday non-reciprocal rotation in the transmission direction.

Optionally, a high reflection region may be coated onto the single polarizing element's optical face that is adjacent to the anti-reflection coated surface of the Faraday optic, whereby increased beam overlap and reduced overall size can be realized for an even number of passes greater than two. If the single polarizing element is a fused silica polarizing beam splitter, a polarization maintaining or PM isolator suitable for high power with only two separate optical components is realized. Similarly, if the single polarizer element is a fused silica polarization splitting beam displacer, a polarization insensitive or PI isolator with only two separate optical components is realized with no critical alignment required. Both forms of isolators have readily scalable beam diameters for high power operation. High power beam quality is limited only by the thermal optic properties of the Faraday rotation optical element.

The present invention thus is an improvement over the systems and devices described in U.S. Pat. Nos. 4,909,612; 5,715,080 and 7,057,791, where two or more polarizing elements are used and high reflection faces are placed upon opposing optical faces of multi-pass Faraday optics to promote more than two passes through the Faraday optic. In contrast to the systems disclosed in these patents, the system of the present invention uses a single polarizing element to simplify construction while also reducing size and cost. In the multi-stage isolator form, the system of the present invention can be constructed with only two optical components and has the further benefit that the isolator is self-aligning with respect to polarization throughout the multi-stage isolator. In addition, the use of high reflection coating region(s) on the optical face of the polarizing element closest to the Faraday optic improves the magnetic efficiency by increasing the number of beam passes through the Faraday optic while maintaining beams that are generally parallel to the magnetic field, thereby reducing the thickness of the Faraday optic and minimizing the required magnetic structure. These distinctions can all be made while increasing the beam size, as required, to prevent optical damage to optical elements within the isolator to scale the power as desired up to the limit imposed by the thermal optic properties of the Faraday optic material used.

In accordance with another aspect of the present invention, multi-stage isolators can be realized by adding a high reflection coating region on the single polarizing element's optical surface furthest from the Faraday optic between duplicate isolation stages such as described above for the preferred embodiment. In the case of a PI isolator, this high reflection coating is best applied to the non-bonded external surface of a quartz quarter-wave plate to flip polarizations between pairs of isolation stages to make path-lengths identical for both polarizations. The quarter wave-plate may be first bonded, such as by optical contact, with its optic axis aligned 45 degrees to each polarization axis of the fused silica polarization splitting beam displacer. Again, simple multiple stage isolators with only two separate optical components that are self-aligning with respect to polarization for easy assembly are possible.

These and other objects, advantages, purposes and features of the present invention will become apparent upon review of the following specification in conjunction with the drawings.

BRIEF DESCRIPTION OF THE DRAWINGS

FIG. 4 is a perspective view of a PI dual stage, dual pass isolator (showing reverse propagation of the beam) with a triple layer displacer in accordance with the present invention.

DETAILED DESCRIPTION OF THE INVENTION

Figure 1A:
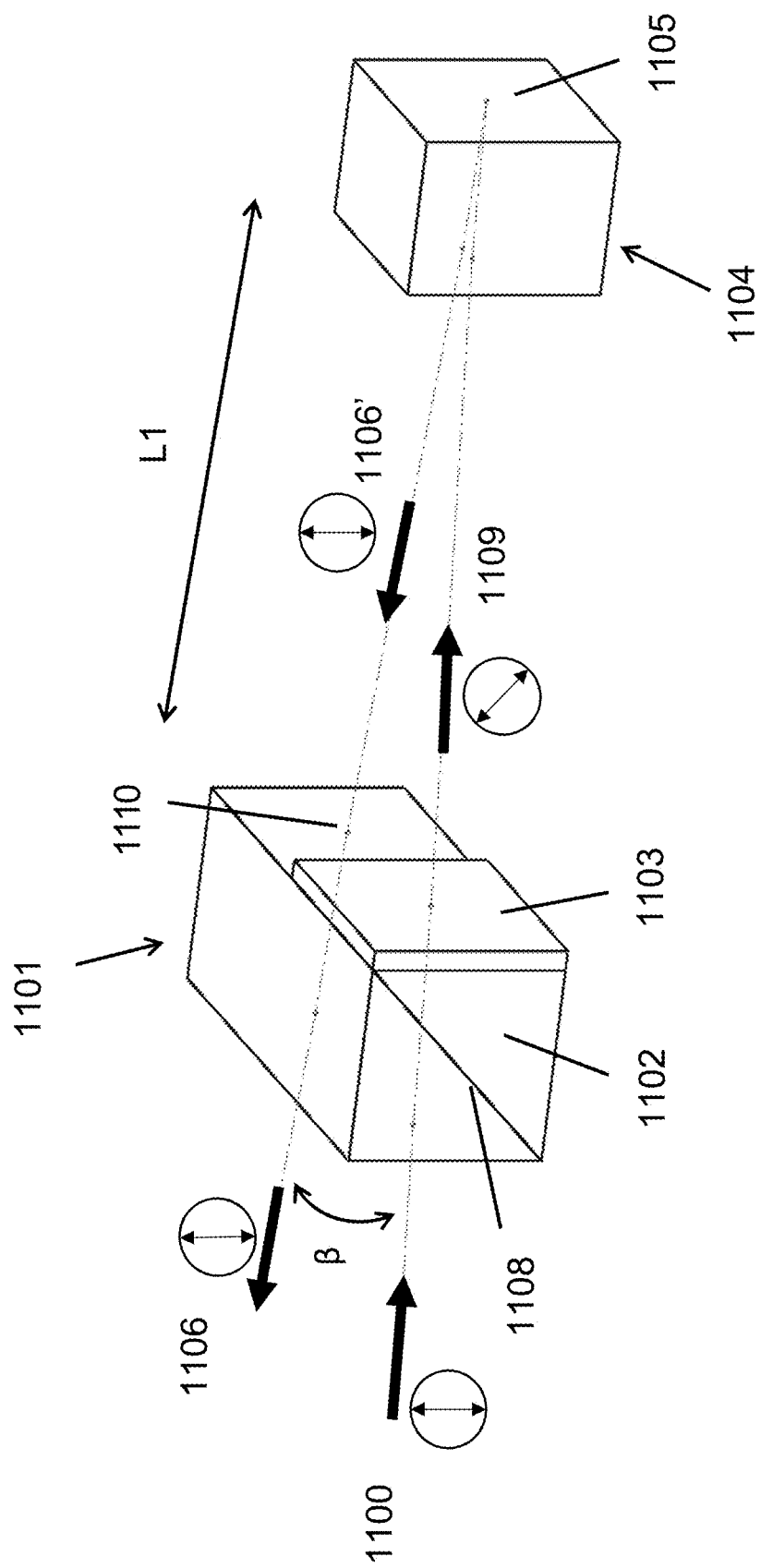
FIG. 1A is a perspective view of a PM single stage, dual pass isolator (showing forward propagation of the beam) in accordance with the present invention.

Referring now to the drawings and the illustrative embodiments depicted therein, FIG. 1A is a perspective view of a PM single stage, dual pass isolator for generally collimated laser radiation that is comprised of only two separate optical components in accordance with the invention. Collimated laser radiation source 1100 with substantially linear p polarization is incident upon single polarization element 1101 comprised of quartz half-waveplate 1103 bonded, such as by adhesive free optical contact, to fused silica PBS 1102. The optic axis of half-waveplate 1103 is rotated by an angle of 22.5 degrees with respect to the original linear p polarization axis (shown as vertical in FIG. 1A), such that highly polarized p polarization transmitted through polarizing coating 1108 is rotated by +45 degrees of reciprocal rotation in half-waveplate 1103 as shown by the circled polarization state arrow 1109.

Laser radiation at 1109 is then incident upon Faraday optic 1104 (such as a Terbium Gallium Garnet (TGG) or other suitable Faraday optic element) which is immersed in a magnetic field that is generally aligned to the beam path, where the beam receives −22.5 degrees of non-reciprocal Faraday polarization rotation for each pass of Faraday optic 1104. Reflection coating 1105 on Faraday optic 1104 facilitates the dual pass beam path in Faraday optic 1104 for −45 degrees of total non-reciprocal polarization rotation which restores the original p polarization state in beam 1106' which is then re-incident upon single polarization element 1101 at point 1110 (where the re-incident location is at a location that does not have the half wave plate 1103 at the polarization element). Radiation from point 1110 is highly p polarized output radiation 1106 upon final pass through the single polarization element 1101. In view of the angle β between collimated input radiation 1100 and output radiation 1106 as well as the separation $L_1$ between single polarization element 1101 and Faraday optic 1104, half-waveplate 1103 is dimensioned and positioned to not clip input 1100 or output 1106 radiation.

Figure 1B:
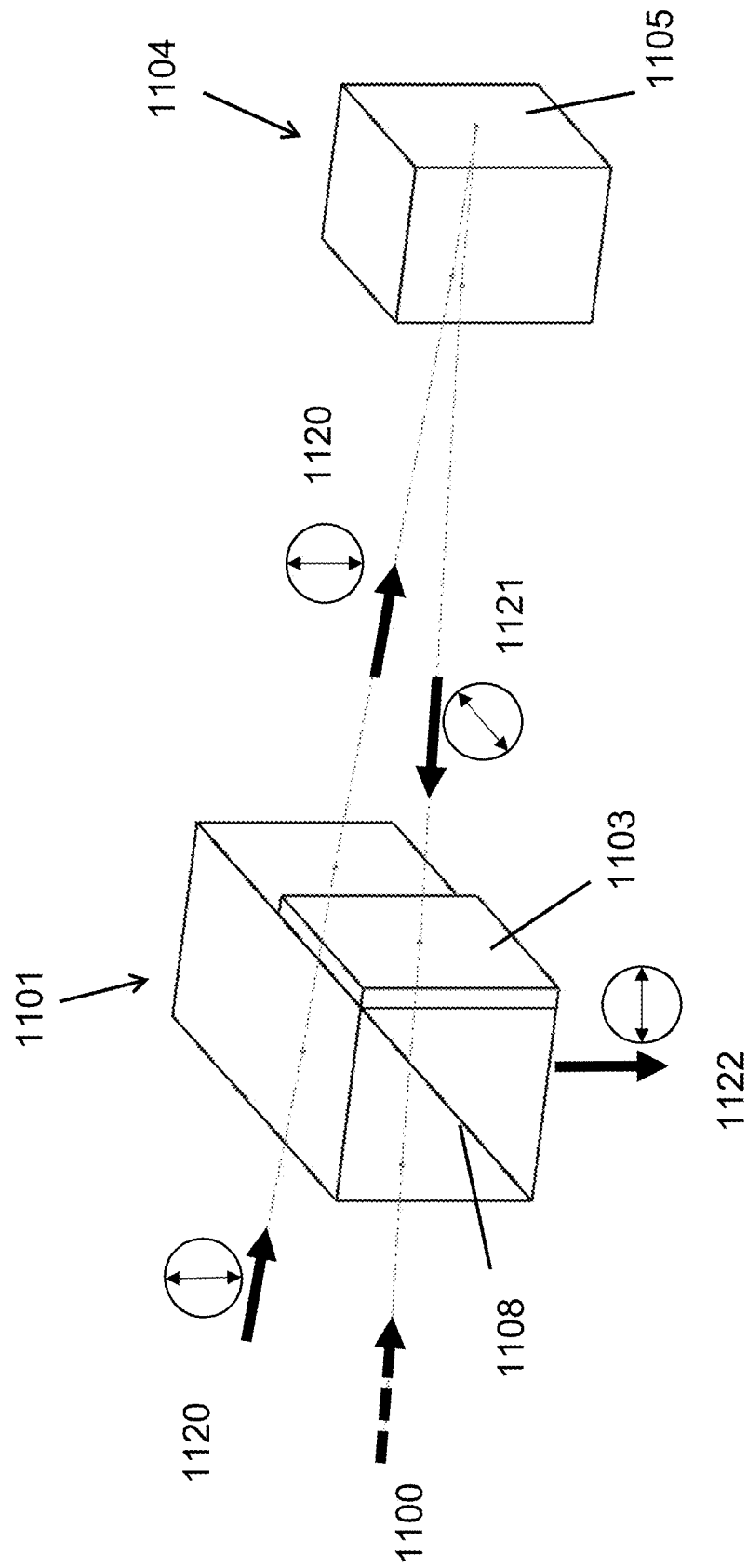
FIG. 1B is another perspective view of the PM single stage, dual pass isolator of FIG. 1A, showing reverse propagation of the beam.

The single stage, dual pass isolator of FIG. 1A also limits or precludes light traveling in the reverse direction from reaching the source of light beam 1100 in FIG. 1A. As shown in FIG. 1B, light 1120 received at single polarizing element 1101 at the side or region of the element that does not have the half wave plate 1103, passes through the single polarizing element and through the faraday optic 1104, which, after it reflects off reflector 1105 so as to make a second pass through the optic 1104, is rotated −45 degrees (beam 1121), which then passes through the half wave plate 1103, which rotates the beam −45 degrees, such that the beam 1122 is an s polarized beam 1122. Such an s polarized beam is reflected by the polarizing coating 1108 away from the source of the light beam 1100.

Figure 1C:
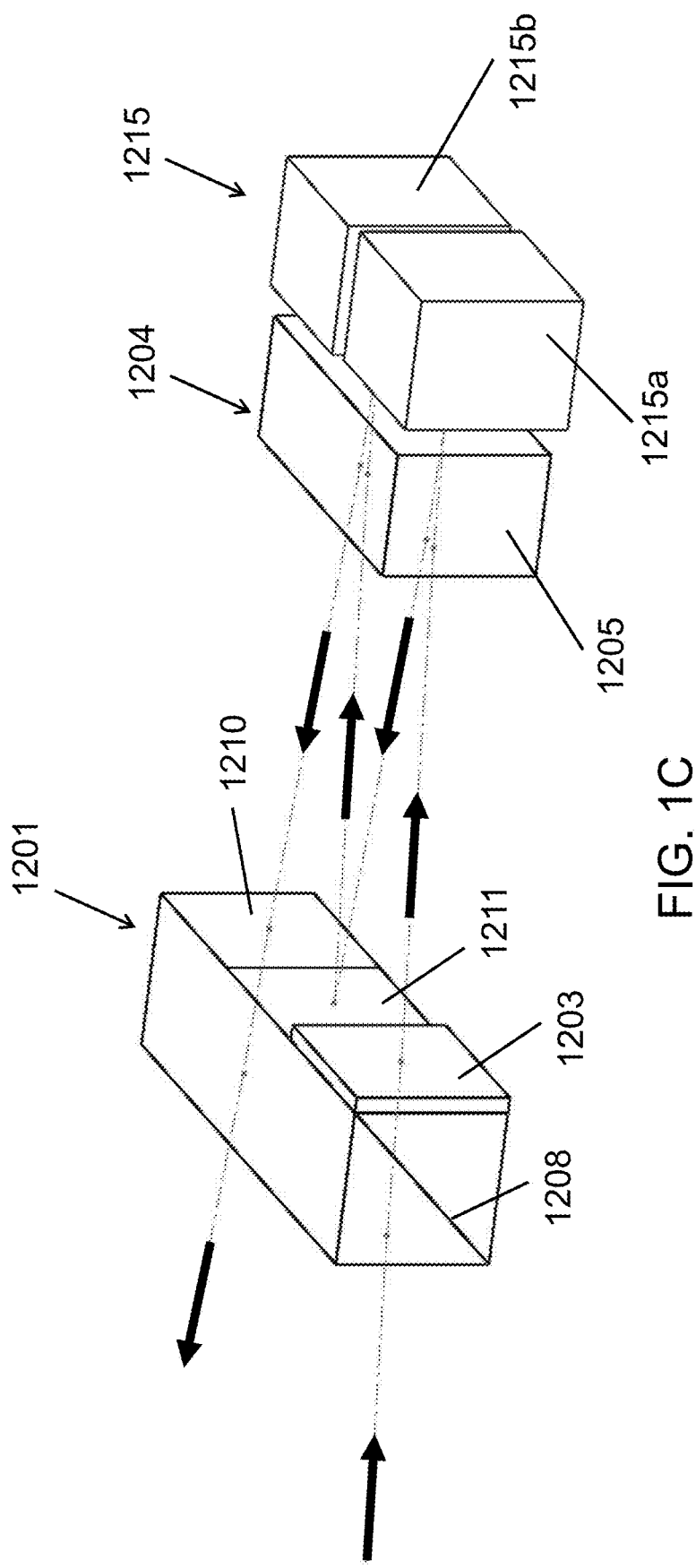
FIG. 1C is a perspective view of a PM single stage, quad pass isolator in accordance with the present invention.

Optionally, if more than two passes are desired through the PM single stage isolator, a reflector may be added at the single polarizing element such that light (after two passes through the faraday optic) reflects back toward the faraday optic for a third and fourth pass (such a single stage, quad pass isolator may be suitable for small magnets or a low Verdet constant faraday optic). Such a configuration is shown in FIG. 1C, where the single polarizing element 1201 has a half wave plate 1203 and a polarizing coating 1208 similar to single polarizing element 1101, discussed above, and the isolator includes a Faraday optic 1204 and reflector 1205 similar to the optic 1104 and reflector 1105 discussed above. Single polarizing element 1201 includes a reflector 1211, such as at a center region between the half wave plate 1203 and the point or region 1210 where the light beam passes back through the single polarizing element 1201. In this configuration, the Faraday optic 1204 comprises a thinner optic or less powered magnetic field, such that each pass through the optic only rotates the polarized light 11.25 degrees (half the rotation achieved by Faraday optic 1104, discussed above), whereby after four passes through the Faraday optic 1204, the light is rotated +45 degrees to counter the −45 degrees rotation achieved by the half wave plate 1203. Thus, the light output from the Faraday optic (after the fourth pass) is "p" polarized light. Optionally, single polarizing element 1201, Faraday optic 1204, and reflector 1211 could be increased in size to support additional passes of the Faraday optic 1204; further reducing the thickness of the Faraday optic or size of the magnetic structure (such as the magnetic structure 1215 of FIG. 1C, which may have two separate magnetic elements 1215a, 1215b, and/or which may be adjustable, as discussed below).

Figure 1D:
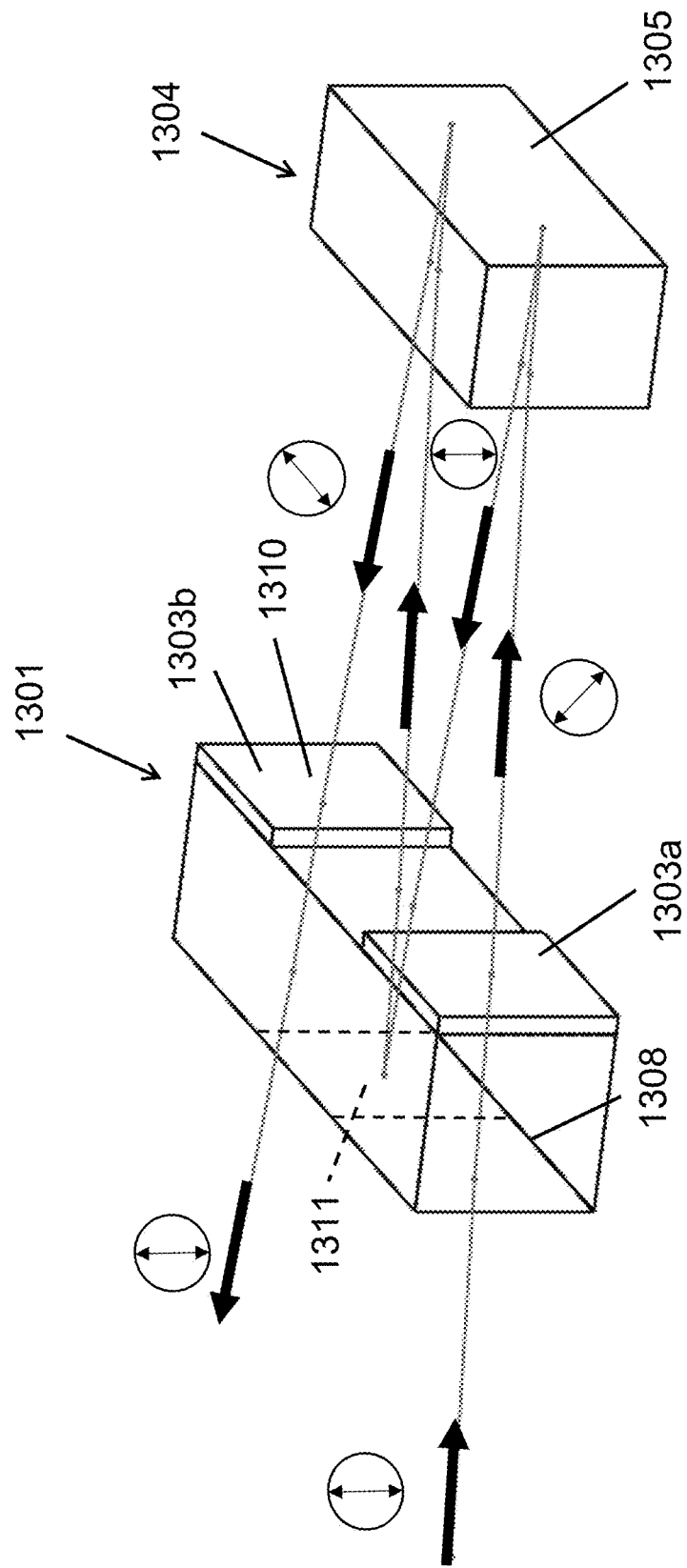
FIG. 1D is a perspective view of a PM dual stage, dual pass isolator in accordance with the present invention.

Optionally, a dual stage, dual pass isolator may include two half wave plates, one for the light at an input region of the single isolator and another at an output region of the single isolator. For example, and such as shown in FIG. 1D, a single polarizing element 1301 has a half wave plate 1303a and a polarizing coating 1308 similar to single polarizing element 1101, discussed above, and the isolator includes a Faraday optic 1304 and reflector 1305 similar to the optic 1104 and reflector 1105 discussed above. Single polarizing element 1301 further includes a reflector 1311, such as at a center region between the half wave plate 1303a and the point or region 1310 where the light beam passes back through the single polarizing element 1301. The single polarizing element 1301 also includes a second half wave plate 1303b at region 1310, such that the light from the Faraday optic 1304 (after its fourth pass through the Faraday optic) is rotated as it passes through the second half wave plate 1303b so that the exiting beam is a p polarized beam. This is because a p polarized input beam will rotate −45 degrees when passing through first half wave plate 1303a, and then will rotate back +45 degrees when making two passes through the Faraday optic 1304, and then will rotate an additional +45 degrees when making another two passes through the Faraday optic (after reflecting off of reflector 1311). The beam then is rotated back −45 degrees by the second half wave plate 1303b to be a p polarized beam as it exits the single polarizing element 1301.

The isolator of the present invention thus provides multiple passes through a Faraday optic. If only two passes are made through the Faraday optic, then more magnetic power may be needed at the optic, which may result in a larger package. By providing for four or more (even number of) passes through the Faraday optic, a smaller magnet package may be used at the Faraday optic.

Figure 2A:
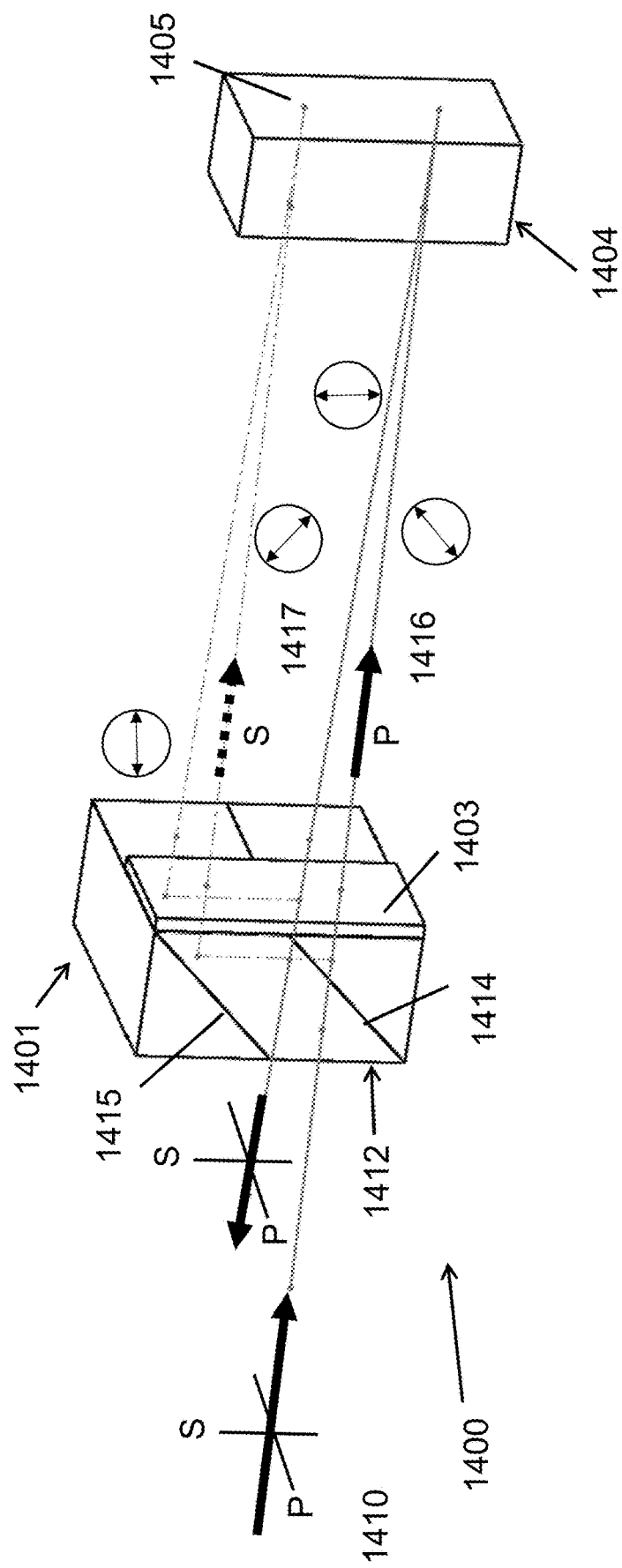
FIG. 2A is a perspective view of a PI single stage, dual pass isolator (showing forward propagation of the beam) in accordance with the present invention.

Referring to FIG. 2A, a perspective view of a single stage, dual pass PI isolator 1400 is shown in accordance with the present invention. The isolator includes a polarizing element 1401 and a Faraday optic 1404, with a half wave plate 1403 disposed at part of the polarizing element and a reflector 1405 disposed at the Faraday optic 1404. In the illustrated embodiment, the polarizing element 1401 has a first polarizing coating 1414 and a second polarizing coating 1415 at the diagonal surfaces of parallelepiped 1412 that are similarly bonded, such as through optical contact, to fused silica prisms 1413. Randomly polarized radiation 1410 from a source in the forward direction is resolved into "p" and "s" polarized beams 1416 and 1417, respectively, at the first polarizing coating 1414, with the s polarized beam being reflected upward by polarizing coating 1414. The "s" polarized beam 1417 is further reflected at the second polarizing coating 1415 and then transmitted out of the output AR coated surface of parallelepiped 1412 precisely parallel to and displaced from the "p" polarized beam 1416. As shown in FIG. 2A, the beams pass through the wave plate 1403 where they are rotated −45 degrees, and then the rotated p and s beams pass through the Faraday optic 1404 and reflect off of the reflector 1405, so as to make two passes through the optic 1404 (where they are rotated back +45 degrees) and return towards the polarizing element 1401. The beams enter the polarizing element at a location devoid of the half wave plate 1403, whereby the s beam is reflected downward by the polarizing coating 1415 and further reflected by the polarizing coating 1414 so as to exit the polarizing element 1401 with the p beam.

Figure 2B:
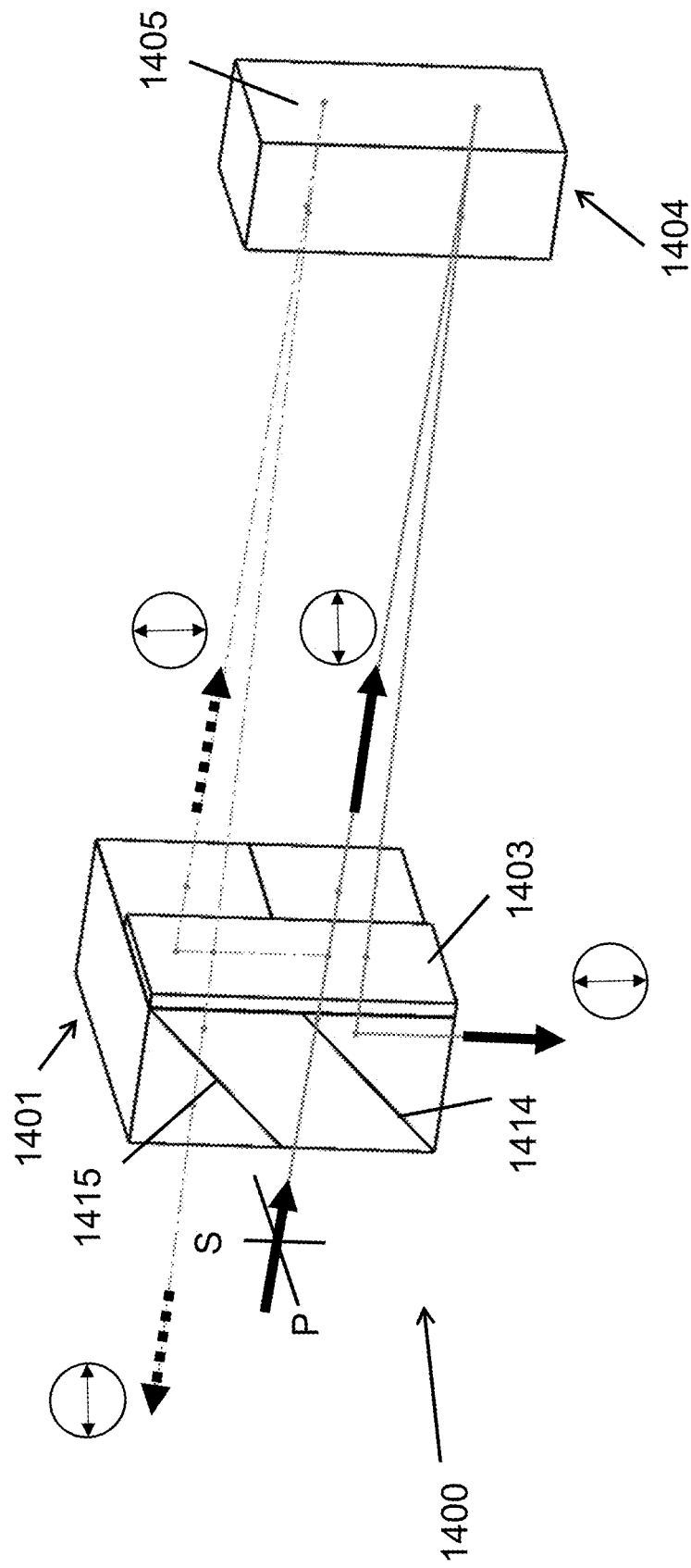
FIG. 2B is another perspective view of the PI single stage, dual pass isolator of FIG. 2A, showing reverse propagation of the beam.

For light traveling in the reverse direction (FIG. 2B), the 90 degree rotation (+45 degrees by the Faraday +45 degrees by the wave plate) in the reverse direction causes the upper beam (the beam reflected by the polarizing coatings 1414, 1415) to pass through the upper diagonal (not reflected by the polarizing coating 1415) and the lower beam to be reflected by the lower diagonal polarizing coating 1414. Thus, reverse propagation of light is precluded from exiting the isolator in the direction of the source of light beam 1410 of FIG. 2A. Therefore, reverse propagating light is unable to couple back into the source.

Figure 3A:
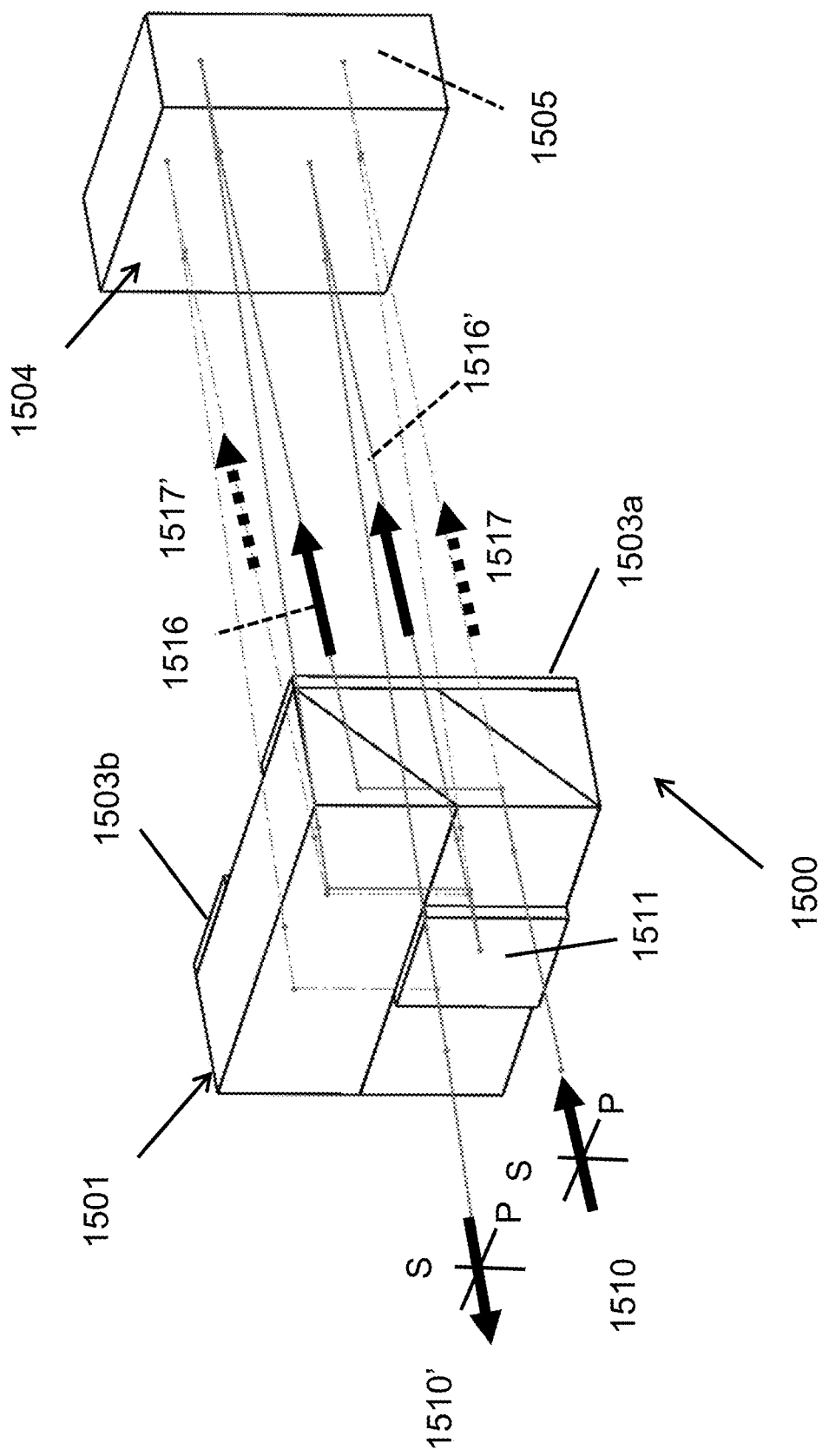
FIG. 3A is a perspective view of a PI dual stage, dual pass isolator (showing forward propagation of the beam) in accordance with the present invention.

A two stage PI isolator is increasingly desired to manage back reflections from PI laser systems generating over 100 W of average power. Leakage from traditional single stage isolators can be sufficient to be amplified to levels which are harmful to internal laser components. Referring to FIG. 3A, a perspective view of a dual stage, dual pass PI isolator 1500 is shown in accordance with the present invention. The isolator includes a polarizing element 1501 with half wave plates 1503a and 1503b and quarter wave plate 1511 disposed at part of the polarizing element and a reflector 1505 disposed at the Faraday optic 1504. Collimated laser radiation 1510 is incident upon a single fused silica polarizing beam displacer 1501 (PBD) where it is resolved into forward propagating "s" polarization beam 1516 (solid line) and "p" polarization beam 1517 (dashed line). Both "p" and "s" polarization beams are transmitted through first isolation stage quartz half waveplate 1503a which may be bonded to beam displacer 1501 with optic axis +22.5 degrees such that the "p" and "s" polarized beams experience a +45 degree polarization rotation about the forward propagation axis to be +45 and +135 degree polarized beams, respectively.

The beams 1516, 1517 then make two passes through the Faraday optic 1504 (via reflection off of reflector 1505) and return to the PBD 1501, where the p beam passes through the PBD and through a ¼ wave plate 1511 and reflects off a reflector at the back side of the wave plate 1511 so as to again propagate through the PBD 1501. The s beam also passes through the PBD and reflects off of the upper reflector coating and again off of the lower reflector coating so as to pass through the ¼ wave plate 1511 and reflects off a reflector at the back side of the wave plate 1511 so as to again propagate through the PBD 1501.

After the first pass of the ¼ wave plate 1511, the light is circularly polarized. The reflection off of the backside of the ¼ wave plate causes a 180 degree phase shift thereby reversing the circularity. The return pass through the ¼ wave plate converts the light back to being planar polarized, but with the light then being rotated 90 degrees, such that the s beam becomes a p beam and the p beam becomes an s beam. This allows the two beams to flip planes and travel the same path length. In other words, the now s beam 1517' (formerly the p beam) now reflects off of the coatings in the PBD, while the now p beam 1516' (formerly the s beam) now passes directly through the PBD. Thus, by the time the two beams have again passed through the Faraday optic and again passed through the PBD so as to exit the PBD as beam 1510', the s beams and p beams have traveled the same path length. For collimated laser light, this is very important and allows very high beam quality to be maintained. If a particular application does not require high beam quality, ¼ wave plate 1511 could be removed and replaced with a high reflection coated region.

Thus, and as shown in FIG. 3A, the two beams will be reflected between Faraday optic high reflector 1505 (at the rear or opposite end of the Faraday optic 1504) and single fused silica PBD first stage high reflector 1511 N times such that 2N passes are made through Faraday optic 1504 before the two beams are incident upon single fused silica AR coated region of the beam displacer 1501.

Figure 3B:
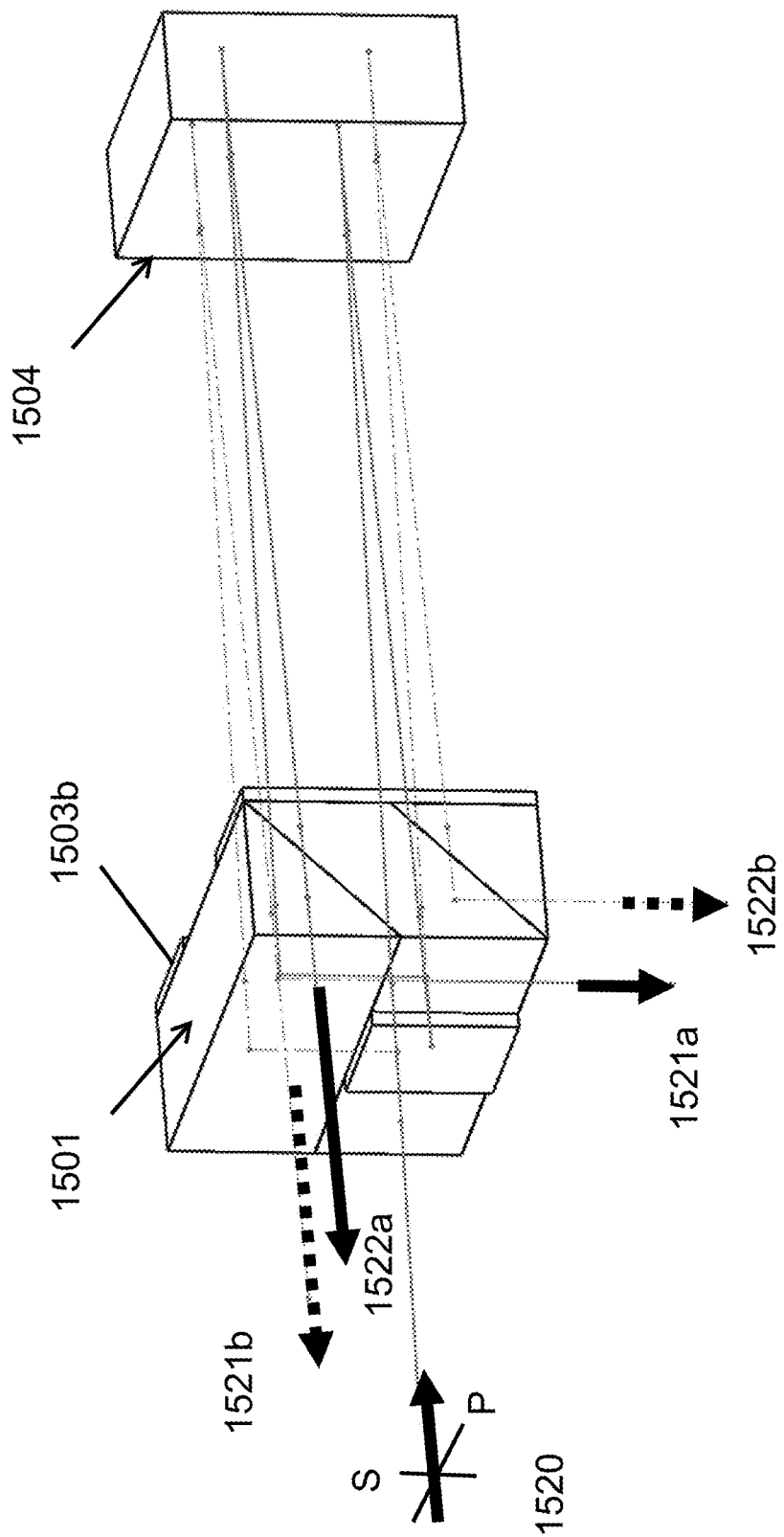
FIG. 3B is another perspective view of the PI dual stage, dual pass isolator of FIG. 3A, showing reverse propagation of the beam.

Reverse propagating radiation 1520 (FIG. 3B), will follow the identical ray path and polarization states until after the rays have been transmitted through the second stage half-waveplate where the −45 degrees of second stage Faraday rotation is added to −45 degrees of reciprocal second stage half-waveplate rotation to rotate the polarizations of both beams by −90 degrees such that they are rejected away from the forward beam propagation axis as shown by rejected ray lines in FIG. 3B. As shown in FIG. 3B, one beam of reverse propagating beam 1520 passes through the PBD 1501 and wave plate 1503b and reflects back from the Faraday optic 1504, whereby it is rotated such that it reflects downward at the lower reflector coating of the PBD 1501 and exits as a first stage rejected beam 1521a. The other polarized beam of the initial reverse propagating beam 1520 reflects upward in the PBD 1501 and further reflects to the Faraday optic and back, where it is rotated such that it passes through the PBD 1501 and exits the PBD as first stage rejected beam 1521b.

After the residual radiation is reduced in power by typically 30 dB relative to the original back-reflected power in the second stage isolator, the polarizations are again flipped by quarter waveplate before repeating the process in the first isolation stage, where again −45 degrees of first stage Faraday rotation is added to −45 degrees of reciprocal first stage half-waveplate rotation to again rotate the polarizations of both beams by −90 degrees such that they are once again rejected away from the original forward beam propagation axis as shown by the lines 1522a, 1522b in FIG. 3B. With the first stage 30 dB isolation similar to the second stage 30 dB isolation, the residual radiation from the original back-reflected power level is reduced by approximately 60 dB, thereby ensuring that none of this back-reflected light can damage or disrupt the laser system.

Referring now to FIG. 4, an isolator 1600 comprises a single polarized beam displacer 1601 having three reflective layers or coatings 1614a, 1614b, 1614c. The isolator 1600 operates in a similar manner to isolator 1500, discussed above, for forward propagating beams. However, by adding a third layer to the displacer, all four rejected beams 1621a, 1621b, 1622a, 1622b can be directed in the same direction as they exit the isolator. This simplifies the beam dump and thermal management of the high power reverse power.

The reciprocal polarization rotators need not be half-waveplates, they could also be (quartz) optical rotators, for example, or other suitable reciprocal polarization rotators. All of the above quartz waveplates need not be bonded to the single fused silica PBD, however aligning their optical axis and then bonding such waveplates to fused silica optical components such as polarizing beam-splitter cubes by optical contact is desired. Bonding these quartz waveplates directly to the single fused silica PBD to form a single optical part during final assembly has the advantage of greatly reducing the overall cost, parts count and assembly time for the optical isolator of this invention. Thus, the present invention provides a high performance PI isolator that is scalable in power with beam diameter that can be fabricated with only two separate optical components.

Although specifics above were given for a TGG Faraday optic, any Faraday optic material may be used in accordance with the present invention, such as, for example, ferromagnetic, paramagnetic, semiconductor and diamagnetic materials and/or the like. In particular, diamagnetic materials which typically have a very low Verdet constant but often have extremely low absorption can function well as temperature insensitive optical isolators in accordance with the invention because their Verdet constant is only very weakly related to temperature. The specific signs of reciprocal and non-reciprocal rotation need not be limited to those described above—they can be mutually reversed by reversing the sign of the applied magnetic field to the Faraday optic and rotating the direction of the reciprocal polarization rotators accordingly.

High reflection coatings should impart a pure 180 degree phase shift upon reflection and need not be limited to thin films as they can also be made from metal coatings.

The Faraday optics high reflection coated surface may have a protective overlayer, such as $SiO_2$ or the like, and then a metallization layer, such as gold or the like, so that the Faraday optic may be soldered directly to a heat sinking housing with, for example, a gold-tin solder layer for enhanced conduction of heat out through the high reflection coated surface. Heat flow substantially parallel to the beam path minimizes any radial heat flow across the beam cross section that can result in thermal lens focal shifts and thermal birefringence.

Optionally, it is another aspect of the present invention that the Faraday optic may comprise a layered structure with a transparent heat conductive layer bonded to one or both optical faces of a diamagnetic, paramagnetic or ferromagnetic Faraday rotating material. Such transparent heat conductive layers, in conjunction with sufficient multi-passes to ensure that the Faraday optic is thin relative to the beam diameter, ensures that heat flow is substantially parallel to the beam path within the Faraday optic. The function of the transparent heat conductive layer is described in detail in U.S. Publication No. 2014/0218795, which is hereby incorporated herein by reference in its entirety. Heat flow parallel to the beam path eliminates radial temperature gradients responsible for thermal lens focal shift and thermal birefringence.

Another aspect of the present invention is that the multi-pass Faraday rotator may use an adjustable magnetic structure that is capable of modifying the magnetic field strength generally aligned to the beam path with the Faraday optical element(s) used in the multi-pass Faraday rotator. In the case of multi-stage optical isolators, such magnetic field adjustability can be independent or different for each stage for improving the temperature and/or wavelength bandwidth performance of the optical isolator. The adjustable magnetic structure is adjustable relative to the optical elements via any suitable electrical or mechanical or electromechanical means that may adjust the space or gap between the magnetic structure and the optical element to provide the desired performance of the optical isolator. For example, and such as shown in FIG. 1C, an adjustable magnetic structure 1215 may include two magnetic structures 1215*a* and 1215*b*, which can be moved independently or in tandem (relative to the Faraday optic 1204) to achieve different faraday rotations per stage.

Therefore, the present invention provides an optical isolator having one or more isolation stages using a single polarizing element in conjunction with a multi-pass Faraday rotator and one 45 degree reciprocal polarization rotation element per isolation stage for improved alignment simplicity, reduced parts count and lower cost. The multi-pass Faraday rotator optionally and desirably has an even number of multi-passes and may comprise a Faraday optic with a highly reflective coating on one optical face and an anti-reflective coating on the opposite optical face nearest to the single polarizing element. A magnetic field generally aligned to the beam path in the multi-pass Faraday rotator causes 45 degree non-reciprocal polarization rotation in the Faraday optic for each isolation stage. The 45 degree reciprocal polarization rotation element may comprise a quartz waveplate that is bonded, such as by adhesive free optical contact for high power applications, to a surface of the single polarizing element in the optical path of only one pass of the beam and aligned for the opposite sense rotation to the Faraday non-reciprocal rotation.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. An optical isolator for collimated laser radiation, comprising:
   a Faraday rotator including a Faraday optic immersed in a magnetic field and having opposing front and back faces;
   a first reflector disposed at the back face of the Faraday optic; and
   a polarization element arranged to receive a forward-propagating collimated laser beam, the forward-propagating collimated laser beam including a first polarization component, the polarization element including:
   a first polarizing coating configured to transmit, along a first path, the first polarization component as a first polarized and collimated laser beam, the first path extending to the front face of the Faraday optic and through the Faraday optic to the first reflector, whereupon the first reflector reflects the first polarized and collimated laser beam onto a second path through the Faraday optic toward the polarization element, the second path being at a non-zero angle to the first path, and
   a first half wave plate disposed at a face of the polarization element facing the Faraday optic, the first half wave plate intercepting the first path but not the second path, the first half wave plate being configured to impose a polarization rotation on the first polarized and collimated laser beam that is opposite a polarization rotation imposed on the first polarized and collimated laser beam by the Faraday rotator.

2. The optical isolator of claim 1, wherein the first and second paths are contained in a plane, and the first polarizing coating is at a 45-degree angle to the plane.

3. The optical isolator of claim 1, wherein the first half wave plate is bonded to the polarization element.

4. The optical isolator of claim 1, wherein the first reflector is a coating on the back face of the Faraday optic.

5. The optical isolator of claim 1, wherein the second path becomes increasingly separated from the first path as the second path approaches the polarization element.

6. The optical isolator of claim 1, wherein:
   the first half wave plate is configured to impose a 45-degree polarization rotation on the first polarized and collimated laser beam;
   the Faraday rotator is configured to impose a 22.5-degree polarization rotation on the first polarized and collimated laser beam for each pass of the first polarized and collimated laser beam between the front and back faces of the Faraday optic; and
   the second path passes through the first polarizing coating.

7. The optical isolator of claim 6, wherein the first polarized and collimated laser beam, when propagating along the second path, is transmitted by the first polarizing coating to form a collimated output beam of the optical isolator.

8. The optical isolator of claim 7, wherein a reverse-propagating collimated laser beam of same polarization as the collimated output beam, when incident on the optical isolator and counter-propagating with respect to the collimated output beam, is transmitted by the first polarizing coating onto the second path but reflected by the first polarizing coating from the first path to be rejected by the optical isolator.

9. The optical isolator of claim 6, wherein:
   the first polarizing coating is configured to reflect, as a second polarized and collimated laser beam, a second polarization component of the forward-propagating collimated laser beam, the second polarization component being orthogonal to the first polarization component;
   the polarization element further includes a second polarizing coating parallel to the first polarizing coating and configured to reflect the second polarized and collimated laser beam along a third path through the first half wave plate to the front face of the Faraday optic and through the Faraday optic to the first reflector, whereupon the first reflector reflects the second polarized and collimated laser beam onto a fourth path through the Faraday optic toward the second polarizing coating, the fourth path being at the non-zero angle to the third path such that the fourth path bypasses the first half wave plate to reach the second polarizing coating.

10. The optical isolator of claim 9, wherein the first and second paths are contained in a plane, the first and second polarizing coatings are offset from each other in a dimension orthogonal to the plane, the first and third paths are parallel but offset from each other in the dimension orthogonal to the plane, and the second and fourth paths are parallel but offset from each other in the dimension orthogonal to the plane.

11. The optical isolator of claim 10, wherein each of the first and second polarizing coatings is oriented at 45 degrees to the plane.

12. The optical isolator of claim 9, wherein the second polarizing coating, when the second laser beam is incident thereon from the fourth path, reflects the second polarized and collimated laser beam toward the first polarizing coating, whereafter reflection of the second polarized and collimated laser beam by the first polarizing coating combines the first and second polarized and collimated laser beams to form a collimated output beam of the optical isolator.

13. The optical isolator of claim 1, wherein:
the first half wave plate is configured to impose a 45-degree polarization rotation on the first polarized and collimated laser beam;
the Faraday rotator is configured to impose a 11.25-degree polarization rotation on the first laser beam for each pass of the first polarized and collimated laser beam between the front and back faces of the Faraday optic; and
the optical isolator further includes a second reflector disposed at a face of the polarization element facing the Faraday optic to reflect the first polarized and collimated laser beam from the second path onto a third path through the Faraday optic to the first reflector, whereupon the first reflector reflects the first polarized and collimated laser beam onto a fourth path through the Faraday optic toward the polarization element, the fourth path bypassing each of the first half wave plate and the second reflector to reach the first polarizing coating.

14. The optical isolator of claim 1, wherein:
the first half wave plate is configured to impose a 45-degree polarization rotation on the first polarized and collimated laser beam;
the Faraday rotator is configured to impose a 22.5-degree polarization rotation on the first polarized and collimated laser beam for each pass of the first polarized and collimated laser beam between the front and back faces of the Faraday optic;
the second path bypasses the first half wave plate and passes through the first polarizing coating; and
the optical isolator further includes:
a second reflector disposed at a face of the polarization element facing away from the Faraday optic and configured to reflect the first laser beam, after transmission through the first polarizing coating, from the second path onto a third path through the first polarizing coating and the Faraday optic to the first reflector, whereupon the first reflector reflects the first polarized and collimated laser beam onto a fourth path through the Faraday optic toward the first polarizing coating, and
a second half wave plate disposed at a face of the polarization element facing the Faraday optic, the second half wave plate intercepting the fourth path, but not the first, second, and third paths, to impose on the first polarized and collimated laser beam a 45-degree polarization rotation that is opposite the polarization rotation imposed by the Faraday rotator.

15. The optical isolator of claim 14, wherein the first and second half wave plates are bonded to the polarization element.

16. The optical isolator of claim 1, further comprising an adjustable magnetic structure configured to generate the magnetic field.

17. The optical isolator of claim 1, further comprising a magnetic structure configured to generate the magnetic field, the magnetic structure including at least two separate magnetic elements.

* * * * *